(12) United States Patent
Gelderie et al.

(10) Patent No.: US 6,818,267 B1
(45) Date of Patent: Nov. 16, 2004

(54) FIRE PROTECTION GLAZING, METHOD FOR PRODUCING THE SAME AND MATERIAL USED IN THIS PRODUCTION METHOD

(75) Inventors: Udo Gelderie, Stolberg (DE); Simon Frommelt, Haan (DE)

(73) Assignee: Vetrotech Saint-Gobain (International AG, Bern (CH)

( * ) Notice: Subject to any disclaimer, the term of this patent is extended or adjusted under 35 U.S.C. 154(b) by 0 days.

(21) Appl. No.: 09/979,020

(22) PCT Filed: May 15, 2000

(86) PCT No.: PCT/EP00/04350

§ 371 (c)(1),
(2), (4) Date: Aug. 23, 2002

(87) PCT Pub. No.: WO00/70181

PCT Pub. Date: Nov. 23, 2000

(30) Foreign Application Priority Data

May 15, 1999 (DE) .......................... 199 27 507

(51) Int. Cl.⁷ ............................ E06B 3/24; C03C 27/00; C08K 3/04
(52) U.S. Cl. .......................... 428/34; 156/109; 524/496; 524/526; 52/786.13
(58) Field of Search .......................... 428/34; 52/786.13, 52/786.15; 156/109; 524/496, 526

(56) References Cited

U.S. PATENT DOCUMENTS

| | | | |
|---|---|---|---|
| 3,791,910 A | 2/1974 | Bowser | ........................ 161/45 |
| 4,215,164 A | 7/1980 | Bowser | ........................ 428/34 |
| 4,268,581 A | * 5/1981 | De Boel | ........................ 428/428 |
| 5,310,777 A | 5/1994 | Sekido et al. | ................ 524/496 |

FOREIGN PATENT DOCUMENTS

| | | |
|---|---|---|
| EP | GB 1524848 | 9/1978 |
| EP | 0 590 978 A1 | 4/1994 |
| EP | 0 811 656 A1 | 12/1997 |
| FR | 2294313 | * 7/1976 |
| FR | 272 6316 | 6/1996 |

OTHER PUBLICATIONS

Patent Abstract of Japan C–1187, vol. 18, No. 198, Apr. 7, 1994.

* cited by examiner

*Primary Examiner*—Donald J. Loney
(74) *Attorney, Agent, or Firm*—Oblon, Spivak, McClelland, Maier & Neustadt, P.C.

(57) ABSTRACT

A glazing assembly for protecting against fire exhibits at least two panes adhesively bonded together via a spacer and a water-comprising intermediate layer which fills the intermediate space between the panes. The spacer is composed of a string, applied by extrusion over the peripheral region of a pane, made of a butyl polymer obtained from 40 to 65% by weight of polyisobutylene, from 10 to 25% by weight of carbon black and from 10 to 40% by weight of filler. Within these ranges, the composition is chosen so that the butyl polymer exhibits, at a temperature of 80° C., a transverse or shear modulus of elasticity of G* of 1.2 to 2.2 MPa.

16 Claims, No Drawings

FIRE PROTECTION GLAZING, METHOD FOR PRODUCING THE SAME AND MATERIAL USED IN THIS PRODUCTION METHOD

FIELD OF THE INVENTION

The invention relates to a glazing assembly for protecting against fire made of at least two panes connected together using a spacer adhesively bonded to the panes and of a water-comprising intermediate layer which fills the intermediate space between the panes. The invention also relates to a mastic composition capable of being used to form an adhesively-bonded spacer.

BACKGROUND OF THE INVENTION

Glazing assemblies for protecting against fire of this type are known, for example from the document EP 0 590 978 A1. In the case of these known glazing assemblies for protecting against fire, the spacer is composed of a rigid material, namely made of metal or of ceramic, and the adhesive bonding of the spacer to the panes is carried out using adhesive tapes made of synthetic rubber, in particular made of butyl rubber. In addition, the peripheral joint between the spacer and the edges of the panes is rendered leaktight by virtue of an adhesive leaktightness body.

Glazing assemblies for protecting against fire having the abovementioned structure are also known from the document Pat. Abstr. of Japan, C 1187, Apr. 7, 1994, volume 18, No. 198. In the case of these glazing assemblies for protecting against fire, use is made, as spacer, of a shaped tape made of acrylic polymer. The shaped tape is provided, on the sides bearing on the panes, each time with an adhesive layer based on acrylic resin. The acrylic polymers have a relatively low softening temperature and also a relatively low decomposition temperature. In the event of fire, they form unpleasant and troublesome gases.

During the manufacture of known glazing assemblies for protecting against fire, the installation of the shaped sections or shaped tapes forming the spacer requires considerable manual labour. For this reason there is keen interest relating to the use of known processes (see, for example, document DE 2555383 C3) for the manufacture of insulating panes, for the purpose of the manufacture of the abovementioned glazing assembly for protecting against fire, during which the spacer is applied by extrusion in the form of a continuous string of material over the peripheral region of a pane, using an appropriate extrusion device. However, in this case, it turned out that known materials are not appropriate for the present application.

The glazing assemblies for protecting against fire of the abovementioned type are frequently composed of three to five panes and, correspondingly, of two to four intermediate spaces, each time with a spacer and a water-comprising filling. During the manufacture of multilayer glazing assemblies for protecting against fire of this type, each time after the application of a spacer, the following pane is positioned and, using a mechanical press, the pile of layers is compressed to the set thickness desired for the intermediate space. This set thickness for the intermediate space must not be modified when, after the application of the following spacer, the pile of layers is subjected to a further compression procedure, to compress the following intermediate space to the set thickness desired. Furthermore, the spacers must retain their stability and their function even in the event of fire. The physical and chemical properties of a thermoplastic material intended for the spacers are consequently required to meet various requirements, which are not satisfied by the materials known for similar applications.

SUMMARY OF THE INVENTION

The fundamental object of the invention is to develop and to make available material compositions which satisfy the special requirements relating to the machine manufacture of glazing assemblies for protecting against fire of the abovementioned type. These materials must in particular, first, be able to be extruded using commercial machines and be able to make possible the plastic deformation necessary during the following compression procedure. However, they must, secondly, exert a sufficient internal strength and a sufficient internal stability and must no longer modify, after the first compression procedure, during the following compression procedures, the transverse cross sectional size at which they have already arrived.

DETAILED DESCRIPTION OF THE INVENTION

In accordance with the invention, this object is achieved in that the spacer is composed of a string, applied by extrusion over the peripheral region of a pane, made of a butyl polymer comprising from 40 to 65% by weight polyisobutylene, from 10 to 25% by weight of carbon black and from 10 to 40% by weight of a filler, and in that the composition is chosen within this range so that the butyl polymer exhibits, at a temperature of 80° C., a transverse or shear modulus of elasticity $G^*$ of 1.2 to 2.2 MPa.

Advantageously, the spacer is composed of a butyl polymer which comprises from 30 to 60% by weight of polyisobutylene, from 12 to 18% by weight of carbon black and from 25 to 35% by weight of filler and which exhibits, at 80° C., a transverse or shear modulus of elasticity $G^*$ of 1.8 MPa.

Substances which do not comprise enclosed portions of air are appropriate as fillers. This is because it turned out that, after filling with the water-comprising poured mass, air adsorbed in the fillers can escape into the intermediate spaces during the subsequent curing process and can form troublesome air bubbles therein. In addition, the desorption of air or other gases releases, at the surface or in the pores, sites capable of taking up a substantial portion of the water of the intermediate layer, which loses its fireproofing protective properties.

According to an advantageous alternative form, the filler comprises at least one substance which undergoes an endothermic reaction when it is brought to a temperature of at least 180° C. Thus, the filler exerts a cooling effect on the spacer which has a favourable influence on the resistance to fire. In fact, an endothermic reaction temperature from 130 or 150° C. will also be advantageous but will also be incompatible with the temperatures for manufacturing and processing butyl rubber.

This endothermic reaction preferably consists of the release of water of hydration or of crystallization.

The reaction advantageously does not release, apart from the water, a substance which is a gas at the reaction temperature.

The filler can be chosen from inorganic or organic substances or their mixtures.

Oxides, hydroxides or salts of sulphates, sulphites, phosphates, hydrogenphosphates, phosphites, hypophosphites, silicates, nitrates, nitrites or carbonates are taken into consideration as inorganic fillers. Mention may be made, for example, of MgO, $CaSO_4$, in particular hydrate, such as $CaSO_4.2H_2O$, $MgSO_4$, in particular hydrate, such as $MgSO_4.7H_2O$, iron(II) or (III) sulphate, in particular hydrate, such as $Fe_2(SO_4)_3.9H_2O$, sodium sulphite, in particular hydrate, such as $Na_2SO_3.7H_2O$, $CaCO_3$, $MgCO_2$, $K_2CO_3$, in particular hydrate, such as $K_2CO_3.2H_2O$, silicates, $Al(OH)_3$, $Mg(OH)_2$, $Al_2O_3$, aluminium or magnesium phosphates, in particular $Mg(H_2PO_4)_2.8H_2O$, salts of phosphorous acid derived in particular from manganese, in particular hydrate, such as $MnHPO_3.H_2O$, manganese hypophosphite, in particular hydrate, such as $Mn(H_3PO_2)_2.H_2O$, $CaNO_2$, in particular hydrate, such as $CeNO_3.3H_2O$, or other inorganic substances having the properties mentioned.

Salts of organic acids, such as citrates, in particular sodium citrate pentahydrate, tartrates, in particular sodium tartrate dihydrate, mesotartrates, in particular calcium mesotartrate trihydrate, or glyconates, in particular calcium d-glyconate monohydrate, are taken into consideration as organic filler.

The special compositions according to the invention are to be chosen, within the ranges indicated above of the chemical composition of the main constituents of the butyl polymer, so that the transverse modulus of elasticity of the material lies, at a temperature of 80° C., within the range from 1.2 to 2.2 MPa. It is only when this condition is met that the material can, first, be extruded using conventional extrusion equipment and that, secondly, it has a consistency and a strength and a capacity for deformation such that it can be compressed to the set size of the space without difficulty during the first compression procedure, while no longer modifying its set dimensions during subsequent compression procedures.

For the reasons set out, namely, first, for reasons of processability using extrusion equipment and, secondly, because of the low ability to deform required after obtaining the final geometry, the material must exhibit proportions of elastic and plastic deformation within entirely specific ratios, which can be defined as material constant by the transverse or shear modulus of elasticity $G^*$. The transverse modulus of elasticity $G^*$, which represents a measurement of the viscoelastic properties of an elastomer, is treated, in the case of dynamic mechanical measurements, in accordance with the equation $G^*=G'+iG''$, as a complex quantity, $G'$ denoting what is known as the "storage modulus", for the purpose of the characterization of the proportion of elastic deformation, and $G''$ what is known as the "loss modulus", for the purpose of the characterization of the proportion of plastic deformation.

The transverse modulus of elasticity $G^*$ is determined using an oscillating measurement system, for example using two coaxial cylinders, which contain, in the annular passage between the external cylinder and the internal cylinder, the material to be determined. An oscillatory movement, variable in frequency and in amplitude, is applied to one of the two cylinders on this occasion. The oscillatory movement transmitted to the other cylinder certainly has the same frequency but, however, displays another amplitude according to the viscoelastic properties of the material to be determined and exhibits, with respect to the oscillation of the driven cylinder, a more or less significant phase shift. The transverse modulus of elasticity $G^*$ can be determined by a corresponding mathematical treatment of the inlet and outlet signals of the measurement device.

The thermoplastic butyl polymers suitable for the application according to the invention have, according to the temperature, the following rheological properties:

| Temperature | Transverse modulus of elasticity G" [MPa] | Storage modulus G' [MPa] | Loss modulus G" [MPa] |
|---|---|---|---|
| 30° C. | 2.7–5.0 | 2.5–4.5 | 1.0–1.5 |
| 50° C. | 1.8–3.0 | 1.6–2.5 | 0.7–1.1 |
| 70° C. | 1.4–2.4 | 1.2–2.0 | 0.6–0.9 |
| 80° C. | 1.2–2.2 | 1.1–1.9 | 0.6–0.9 |

Another subject-matter of the invention is a mastic composition based on butyl rubber as described above.

This composition can be used in particular for preparing spacers in multiple glazing assemblies which may or may not be filled with an intermediate layer, which can be an aqueous gel, for manufacturing a fireproof glazing assembly, but also a resin, for manufacturing a solar cell, or in laminated glazing assemblies including a plastic insert, in particular made of polyvinylbutyral (PVB).

It can also be used for the sealing, pointing or fitting of sheets of glass and various materials, optionally in combination with a conventional material, such as polysulphide.

The invention is described in more detail subsequently with reference to two implementational examples for the purpose of the manufacture of multilayer glazing assemblies for protecting against fire having intermediate layers comprising water and spacers applied by extrusion starting from a thermoplastic butyl polymer.

EXAMPLE 1

A glazing assembly for protecting against fire of the fire-resistance class F 90 in accordance with Standard DIN 4102 is manufactured. This glazing assembly for protecting against fire is composed of four silicate glass sheets of the same size, each time with a thickness of 5 mm, made of thermally prestressed float glass, which are connected to one another each time via spacers with a thickness of 5 mm, made of butyl polymer according to the invention. The intermediate spaces defined between the panes and the spacers are filled with a water-comprising alkaline polysilicate.

After a preliminary preparation of the panes, a string with a thickness of approximately 6 mm of butyl polymer according to the invention is applied, to the edge of a pane, by extrusion using an extrusion device exhibiting a calibrated extrusion nozzle. The fittings and pipes of the extrusion device containing and transporting the butyl polymer, and the extrusion nozzle itself, are provided with heating fittings adjusted so that the butyl string is deposited on the pane at a temperature of approximately 135° C. As soon as a closed spacer is applied by extrusion, the second pane is applied to the spacer and the two panes are compressed, in a platen press, until the set spacing of the two panes, namely 5 mm, is reached. During this compression procedure, the spacer made of butyl material exhibits a temperature of approximately 80° C.

The butyl polymer used in this case is composed of 55% by weight of polyisobutylene, of 15% by weight of carbon black and of 30% by weight of magnesium oxide. It exhibits, at 80° C., a transverse modulus of elasticity of $G^*=1.29$ MPa. This value, from the known mathematical relationship, corresponds to a storage modulus of G'=1.15 MPa and to a loss modulus of G"=0.6 MPa, which means that the proportion of elastic deformation is, also at a temperature of 80° C., considerably greater that the proportion of plastic deformation.

After the compression of the two panes in the platen press until the set spacing has been reached, a closed spacer is again applied by extrusion on the external face of the second pane, the third pane is placed on the spacer and the compression procedure is repeated to arrive at the desired set spacing of the third pane with respect to the second pane. While the final extruded spacer exhibits a temperature of approximately 80° C. and while it experiences plastic deformation in the desired way during the compression procedure, the temperature of the first extruded spacer has fallen to a point such that the latter no longer experiences any plastic deformation during the second compression procedure. The fourth pane is also subsequently connected in a similar manner to the third pane via an additional spacer applied by extrusion over the third pane.

After the final compression procedure, the spacings of the panes with respect to one another, that is to say the thicknesses of the intermediate spaces, are monitored. On this occasion, it turns out that the thickness of the intermediate spaces is not modified by the subsequent compression procedures.

The intermediate spaces are subsequently filled with a water-comprising alkaline polysilicate, as is disclosed in the document WO 94/04355. The poured mass of alkaline polysilicate comprises from 30 to 55% by weight of silicon dioxide, at most 16% by weight of alkali metal oxide and up to 60% by weight of water. For the purpose of producing the necessary filling orifices and ventilating orifices, short cylindrical rod sections were each time applied, before the application of the panes to the corresponding spacers, through the spacers at two diagonally opposite corners, which rod sections were removed after the final compression procedure. After filling with the poured mass, these orifices are closed. The glazing assembly, filled with poured mass, is then subjected for a period of 10 hours to a temperature of 80 to 90° C., during which the poured mass is cured. For the purpose of accelerating the curing procedure, an additional curing agent is added to the poured mass.

Combustion tests in accordance with Standard DIN 4102, part 13, were carried out on several glazing assemblies for protecting against fire manufactured in this way. All the glazing assemblies meet the requirements of the fire-protection class F 90.

EXAMPLE 2

Glazing assemblies for protecting against fire were again manufactured from four panes, each time with a thickness of 5 mm, and from three intermediate spaces, also each time with a thickness of 5 mm, as described in Example 1.

In this case, use is made of a butyl polymer composed of 45% by weight of polyisobutylene, of 22% by weight of carbon black and of 30% by weight of $Al_2O_3$. This butyl polymer exhibits, at 80° C., a transverse modulus of elasticity of G*=1.55 MPa. The storage modulus at this temperature is G'=1.35 MPa and the loss modulus G"=0.76 MPa.

The glazing assemblies for protecting against fire equipped with these spacers, applied by extrusion, also meet the requirements of the fire-resistance class F 90, as was demonstrated by the corresponding combustion tests.

What is claimed is:

1. A glazing assembly for protecting against fire comprising: (i) a first pane having a first peripheral region, (ii) a second pane having a second peripheral region, (iii) a spacer adhesively bonded to the first peripheral region of the first pane and the second peripheral region of the second pane to provide a space between the first pane and the second pane, and (iv) an intermediate layer comprising water disposed in the space between the first pane and the second pane;

wherein the spacer comprises about 40 to about 65 weight % polyisobutylene, about 10 to about 25 weight % carbon black, and about 10 to about 40 weight % of a filler that is substantially free of gases;

the spacer exhibits a transverse or shear modulus of elasticity G* of 1.2 to 2.2 MPa at a temperature of 80° C.; and the spacer is applied by extruding a string over the first peripheral region of the first pane.

2. The glazing assembly of claim 1, wherein the spacer comprises:

about 50 to about 60 weight % polyisobutylene;

about 12 to about 18 weight % carbon black; and about 25 to about 35 weight % filler; and wherein the butyl polymer exhibits a transverse or shear modulus of elasticity G* of about 1.8 MPa at a temperature of 80° C.

3. The glazing assembly of claim 1, wherein the filler further comprises a substance that undergoes an endothermic reaction when it is brought to a temperature of at least 180° C.

4. The glazing assembly of claim 1, wherein the filler comprises a substance having a water of hydration or of crystallization.

5. The glazing assembly of claim 1, wherein the filler comprises an inorganic substance selected from the group consisting of oxides, hydroxides, salts of sulphates, sulphites, phosphates, hydrogen phosphates, phosphites, silicates, nitrates, nitrites or carbonates, and mixtures thereof.

6. The glazing assembly of claim 5, wherein the inorganic filler comprises $CaSO_4$, $CaCO_3$, MgO, $MgCO_3$, a silicate, $Al(OH)_3$, $Al_2O_3$, or aluminum phosphate.

7. The glazing assembly of claim 1, wherein the filler comprises an organic acid salt.

8. The glazing assembly of claim 7, wherein the at least one organic acid salt is a citrate, a tartrate, a mesotartrate, or a glyconate salt.

9. A process for preparing a glazing assembly for protecting against fire comprising: (i) providing a first pane with a first peripheral region, (ii) providing a second pane with a second peripheral region, (iii) extruding a string of polymer on the first peripheral edge of the first pane using a calibrated extrusion nozzle, (iv) contacting the second peripheral edge of the second pane with the string of polymer to provide a space between the first pane and the second pane, (v) filling the space with an intermediate layer comprising water, wherein the string of polymer comprises about 40 to about 60 weight % polyisobutylene, about 10 to about 25 weight % carbon black and about 10 to about 40 weight % of a filler that is substantially free of gases, and wherein the string of polymer exhibits a transverse or shear modulus of elasticity G* of 1.2 to 2.2 MPa at a temperature of 80° C.

10. A composition, comprising:

about 40 to about 65 weight % polyisobutylene;

about 10 to about 25 weight % carbon black; and about 10 to about 40 weight % of a filler which is substantially free of gases, wherein the composition exhibits a transverse or shear modulus of elasticity G* of 1.2 to 2.2 MPa at a temperature of 80° C.

11. The composition of claim 10, comprising:

about 50 to about 60 wt. % polyisobutylene;

about 12 to about 18 wt. % carbon black; and about 25 to about 35 wt. % filler, and wherein the composition exhibits a transverse or shear modulus of elasticity G* of 1.8 MPa at a temperature of 80° C.

12. The composition of claim 11, wherein the filler comprises a substance that undergoes an endothermic reaction when it is brought to a temperature of at least 180° C.

13. The composition of claim 11, wherein the filler comprises a substance that has a water of hydration or of crystallization.

14. The composition of claim 11, wherein the filler comprises an inorganic substance selected from the group consisting of oxides, hydroxides, salts of sulphates, sulphites, phosphates, hydrogen phosphates, phosphites, silicates, nitrates, nitrites or carbonates, and mixtures thereof.

15. The composition of claim 11, wherein the filler comprises an organic acid salt.

16. The composition of claim 11, wherein the organic acid salt is a citrate, a tartrate, a mesotartrate, or a glyconate salt.

* * * * *

UNITED STATES PATENT AND TRADEMARK OFFICE
CERTIFICATE OF CORRECTION

PATENT NO. : 6,818,267 B1
DATED : November 16, 2004
INVENTOR(S) : Udo Gelderie et al.

It is certified that error appears in the above-identified patent and that said Letters Patent is hereby corrected as shown below:

Column 2,
Line 33, "30" should read -- 50 --.

Column 3,
Line 6, "$MgCO_2$" should read -- $MgCO_3$ --;
Line 13, "$CaNO_2$" should read -- $CeNO_3$ --.

Column 5,
Line 57, "45%" should read -- 48% --.

Signed and Sealed this

Twelfth Day of July, 2005

JON W. DUDAS
*Director of the United States Patent and Trademark Office*